United States Patent
Tomoguchi et al.

(10) Patent No.: US 7,662,447 B2
(45) Date of Patent: Feb. 16, 2010

(54) ADHESIVE FOR POLARIZING PLATE, POLARIZING PLATE, METHOD FOR PRODUCING SAME, OPTICAL FILM AND IMAGE DISPLAY

(75) Inventors: Naoki Tomoguchi, Ibaraki (JP); Tadayuki Kameyama, Ibaraki (JP); Morimasa Wada, Ibaraki (JP); Hiroaki Mizushima, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 233 days.

(21) Appl. No.: 10/583,990

(22) PCT Filed: Dec. 15, 2004

(86) PCT No.: PCT/JP2004/018751

§ 371 (c)(1),
(2), (4) Date: Jun. 22, 2006

(87) PCT Pub. No.: WO2005/063910

PCT Pub. Date: Jul. 14, 2005

(65) Prior Publication Data

US 2007/0148483 A1 Jun. 28, 2007

(30) Foreign Application Priority Data

Dec. 26, 2003 (JP) ............................. 2003-432393

(51) Int. Cl.
*B32B 7/10* (2006.01)
(52) U.S. Cl. ................ 428/1.5; 428/1.31; 428/355 EN; 349/96; 349/122; 156/326
(58) Field of Classification Search ................ 428/1.31, 428/1.5, 500, 355 EN; 349/96, 122; 524/557; 156/326–327
See application file for complete search history.

(56) References Cited

U.S. PATENT DOCUMENTS

| | | | | |
|---|---|---|---|---|
| 3,017,282 A | * | 1/1962 | Brill | 106/287.19 |
| 3,052,662 A | * | 9/1962 | Makoto et al. | 525/61 |
| 3,318,856 A | * | 5/1967 | Deyrup | 525/61 |
| 3,660,556 A | * | 5/1972 | Ashikaga | 264/185 |
| 6,884,849 B2 | * | 4/2005 | Chen et al. | 525/272 |
| 2002/0075428 A1 | * | 6/2002 | Saiki et al. | 349/96 |
| 2002/0186461 A1 | * | 12/2002 | Saiki et al. | 359/352 |
| 2003/0137732 A1 | * | 7/2003 | Sugino et al. | 359/491 |
| 2004/0167260 A1 | * | 8/2004 | Chen et al. | 524/321 |

FOREIGN PATENT DOCUMENTS

| | | |
|---|---|---|
| JP | 56-125446 A | 10/1981 |
| JP | 59-091124 A | 5/1984 |
| JP | 7-198945 A | 8/1995 |
| JP | 8-325542 A | 12/1996 |
| JP | 9-77948 A | 3/1997 |
| JP | 9-258023 A | 10/1997 |
| JP | 9-291185 A | 11/1997 |
| JP | 9-318814 A | 12/1997 |
| JP | 10-119162 A | 5/1998 |
| JP | 2002-328230 A | 11/2002 |
| JP | 2003-50313 A | 2/2003 |
| JP | 2004-334168 A | 11/2004 |
| JP | 2005-10760 A | 1/2005 |

OTHER PUBLICATIONS

JPO Website Machine English Translation of JP 07-198945, Kitamura Shuichi et al., Aug. 1, 1995.*
Nitric Acid 98 -99% Health & Safety Data Sheet, GrowHow, Kemira, Jul. 16, 2003.*
International Search Report mailed Feb. 8, 2005 of International Application PCT/JP2004/018751.
Chinese Office Action, Chinese Patent Application No. 200480037279.5 dated Oct. 31, 2008.
Japanese Patent Office Action; Application No. 2003-432393, dated Dec. 17, 2008.

* cited by examiner

*Primary Examiner*—Sophie Hon
(74) *Attorney, Agent, or Firm*—Westerman, Hattori, Daniels & Adrian, LLP

(57) ABSTRACT

An adhesive of the invention for polarizing plates used for forming an adhesive layer in a polarizing plate in which a polarizer and a transparent protective film is are adhering with each other via the adhesive layer, wherein the adhesive for polarizing plates is an aqueous solution containing a polyvinyl alcohol-based resin having an acetoacetyl group and a crosslinking agent, and the aqueous solution has a pH of 4.3 or less. The adhesive of the invention for polarizing plates is good in durability and long in pot life.

10 Claims, No Drawings

ADHESIVE FOR POLARIZING PLATE, POLARIZING PLATE, METHOD FOR PRODUCING SAME, OPTICAL FILM AND IMAGE DISPLAY

This application is a 371 of PCT/JP04/18751 filed Dec. 15, 2004.

TECHNICAL FIELD

This invention relates to an adhesive for polarizing plates. The invention further relates to a polarizing plate using the adhesive for polarizing plates. The polarizing plate alone or an optical film obtained by laminating the polarizing plate can constitute an image display such as a liquid crystal display (hereinafter it is also described as LCD), an organic EL display or PDP.

BACKGROUND ART

In LCD, for example, it is indispensable to dispose polarizers on both sides of a glass substrate providing a surface of a liquid crystal panel according to an image formation scheme adopted in the display. A polarizer is generally obtained in a procedure in which a polyvinyl alcohol-based film is dyed with a dichroic material such as iodine, thereafter, the film is crosslinked with a crosslinking agent and then, mono-axially stretched to thereby form a film. Since the polarizer is manufactured by stretching, it is easy to shrink. Since a polyvinyl alcohol-based film comprises a hydrophilic polymer, the film is very easily deformed especially in a humidified condition. Since the film itself is weak in mechanical strength, there has been a problem that the film is torn. Hence, adopted is a reinforced polarizing plate manufactured in a procedure in which a transparent protective film or transparent protective films each made from triacetyl cellulose or the like are adhered to on one side or both sides of a polarizer. The polarizing plate is manufactured by adhere the transparent protective film onto a polarizer using an adhesive. As an adhesive for polarizing plates used in adhesion of the polarizer and the transparent protective film to each other, an aqueous type adhesive is conventionally preferable and, for example, a polyvinyl alcohol-based adhesive obtained by mixing a crosslinking agent into a polyvinyl alcohol aqueous solution has been employed.

In recent years, improvement on image uniformity and a quality thereof has been requested in company with progress toward higher definition and higher functionality of LCD. Further, durability such as high temperature resistance, moisture resistance or water resistance has also been requested in order to cope with diversification of a use environment. Decrease in thickness and reduction in weight have also been requested due to such as portability of LCD in recent years. Such required characteristics of LCD has rendered another requests imposed on higher performance and a higher functionality, such as uniformity, moisture resistance, heat resistance and decrease in thickness, of a polarizing plate for LCD.

A polyvinyl alcohol-based adhesive is insufficient in moisture and heat resistance and water resistance, and a case of peeling arises at the interface between a polarizer and a transparent protective film in a humidified environment. This is considered because a polyvinyl alcohol-based resin, which is a main component of the adhesive, is a water-soluble polymer and a possibility of dissolution of an adhesive occurs in a situation of dewing.

In order to cope with the problem, a proposal has been offered of an adhesive for polarizing plates containing a polyvinyl alcohol-based resin having an acetoacetyl group, and a crosslinking agent (see, for example, Japanese Unexamined Patent Publication No. 7-198945:Patent Literature 1). An adhesive for polarizing plates described in Patent Literature 1 makes improvement on durability such as moisture resistance and heat resistance and water resistance. However, the adhesive for polarizing plates described in Patent Literature 1 does not show a sufficient pot life. That is, since a pot life and durability of an adhesive have a relationship of a trade-off therebetween, an adhesive laying emphasis on a pot life but insufficient in durability has been used in manufacturing a conventional polarizing plate in consideration of productivity.

DISCLOSURE OF INVENTION

It is an object of the invention to provide an adhesive for polarizing plates long in pot life. It is another object of the invention to provide an adhesive for polarizing plates good in durability and long in pot life.

It is still another object of the invention to provide a polarizing plate using the adhesive for polarizing plates and a manufacturing method therefore. It is yet another object of the invention to provide an optical film laminating the polarizing plate and an image display such as a liquid crystal display.

The inventors have conducted serious studies in order to solve the above tasks with findings that the objects can be achieved with an adhesive for polarizing plates shown below, having led to completion of the invention.

That is, the invention is related to an adhesive for an adhesive for polarizing plates used for forming an adhesive layer in a polarizing plate in which a polarizer and a transparent protective film is are adhering with each other via the adhesive layer, wherein the adhesive for polarizing plates is an aqueous solution containing a polyvinyl alcohol-based resin having an acetoacetyl group and a crosslinking agent, and the aqueous solution has a pH of 4.3 or less.

An adhesive for polarizing plates of the invention is an aqueous solution containing a polyvinyl alcohol-based resin having an acetoacetyl group and a crosslinking agent, which is good in durability. A pH of the aqueous solution used as an adhesive for polarizing plates is adjusted to be 4.3 or less and a pot life can be longer. A pH of the aqueous solution is preferably 4 or less. If a pH exceeds 4.3, a pot life is shortened.

In the adhesive for polarizing plates, a pH of the aqueous solution is preferably in the range of from 2.2 to 4.3. Adjustment of a pH in the aqueous solution within the range can increase a pot life and ensure a satisfactory durability. A pH of the aqueous solution is preferably 2.5 or more and more preferably 3 or more from the viewpoint of durability. A pH of the aqueous solution is preferably adjusted in the range of from 3 to 4 from the viewpoint of a pot life and durability. Since such an adhesive for polarizing plates of the invention has a good durability and a long pot life, a polarizing plate good in durability can be manufactured with good productivity. Moreover, the use of such a polarizing plate enables an image display such as a high performance liquid crystal display to provide.

A pH of the aqueous solution used as the adhesive for polarizing plates can be adjusted in the range by adding an acid.

The adhesive for polarizing plates is preferably used in a case where a polarizer is a polyvinyl alcohol-based polarizer. A transparent protective film is preferably a cellulose-based transparent protective film.

The invention relates to a manufacturing method for a polarizing plate, wherein a transparent protective film is adhered to at least one surface of a polarizer using the above-mentioned adhesive for polarizing plates.

The invention relates to a polarizing plate, which is obtained by the above-mentioned manufacturing method for a polarizing plate, comprising: a polarizer and a transparent protective film which is provided on at least one surface of the polarizer via an adhesive layer.

A thickness of an adhesive layer in the polarizing plate is preferably in the range of from 30 to 300 nm. The adhesive layer is more preferably in the range of from 50 to 200 nm and further more preferably in the range of from 80 to 150 nm. If a thickness of the adhesive is less than 30 nm, an adhesive strength is insufficient, while if a thickness of the adhesive exceeds 300 nm, there occurs a case where a problematic appearance is unpreferably observed.

A pH of an adhesive layer formed by coating the adhesive for polarizing plates and drying the wet coat is preferably 4.3 or less and more preferably 4 or less, similar to that of an aqueous solution of the adhesive. A pH is preferably in the range of from 2.2 to 4.3 and more preferably in the range of from 3 to 4.

The invention is also related to an optical film comprising at least one above polarizing plate.

The invention is further related to an image display comprising the above polarizing plate or the above optical film.

BEST MODE FOR CARRYING OUT THE INVENTION

An adhesive for polarizing plates of the invention comprises a crosslinking agent and a polyvinyl alcohol-based resin having an acetoacetyl group.

A polyvinyl alcohol-based resin having an acetoacetyl group is obtained by reacting a polyvinyl alcohol-based resin and diketene to each other with a known method. Examples of known methods include: a method in which a polyvinyl alcohol-based resin is dispersed into a solvent such as acetic acid, to which diketene is added and a method in which a polyvinyl alcohol-based resin is previously dissolved into a solvent such as dimethylformamide or dioxane, to which diketene is added. Another example is a method in which diketene gas or diketene liquid is brought into direct contact with a polyvinyl alcohol.

Examples of polyvinyl alcohol-based resin include: a polyvinyl alcohol obtained by saponifying a polyvinyl acetate; a derivative thereof; a saponified copolymer of vinyl acetate and a monomer copolymerizable therewith; and polyvinyl alcohols modified by acetalization, urethanization, etherification, grafting, phosphate esterification and the like. Examples of the monomers include, unsaturated carboxylic acids such as maleic anhydride, fumaric acid, crotonic acid, itaconic acid and (meth) acrylic acid, and esters thereof; α-olefins such as ethylene and propylene; (meth)allylsulfonic acid or sodium salt thereof, (meth)allylsulfonate; sodium sulfonate (monoalkyl maleate), sodium disulfonate (alkyl maleate); N-methylolacrylamide; an alkai salt of acrylamide alkylsulfonate; N-vinylpyrrolidone, a derivative of N-vinylpyrrolidone and the like. The polyvinyl alcohol-based resins can be either used alone or in combination of two kinds or more.

While no specific limitation is imposed on a polyvinyl alcohol-based resin, an average degree of polymerization is from about 100 to about 3000, preferably from 500 to 3000 and an average degree of saponification is from about 85 to about 100 mol %, preferably from 90 to 100 mol % in consideration of adherence.

No specific limitation is imposed on a degree of modification by an acetoacetyl group in a polyvinyl alcohol-based resin having an acetoacetyl group or groups as far as the degree of modification is 0.1 mol % or more. If the degree of modification is less than 0.1 mol %, water resistance of an adhesive layer is insufficient, which is improper. A degree of modification by an acetoacetyl group is preferably from about 0.1 to about 40 mol %, more preferably from 2 to 7 mol %. If a degree of modification by an acetoacetyl group exceeds 40 mol %, reaction sites with a crosslinking agent is fewer to thereby reduce an effect of improvement on moisture resistance and heat resistance.

Any of crosslinking agents that have been used in a polyvinyl alcohol-based adhesive can be used as a crosslinking agent in the invention without a specific limitation thereon. A crosslinking agent that can be used is a compound having at least two functional groups having reactivity with a polyvinyl alcohol-based resin. Examples thereof include: alkylene diamines having an alkylene group and two amino groups such as ethylene diamine, triethylene diamine and hexamethylene diamine; isocyanates such as tolylene diisocyanate, hydrogenated tolylene diisocyanate, trimethylolpropane tolylene diisocyanate adduct, triphenylmethane triisocyanate, methylenebis(4-phenylmethane) triisocyanate and isophorone diisocyanate, and ketoxime-blocked products thereof or isocyanates of phenol-blocked products; epoxy compounds such as ethylene glycol diglycidyl ether, polyethylene glycol diglycidyl ether, glycerin di- or triglicydyl ether, 1,6-hexanediol diglycidyl ether, trimethylolpropane triglycidyl ether, diglicidyl aniline and diglycidyl amine; monoaldehydes such as formaldehyde, acetaldehyde, propionaldehyde and butylaldehyde; dialdehydes such as glyoxal, malonaldehyde, succindialdehyde, glutardialdehyde, maleic dialdehyde and phthaldialdehyde; amino-formaldehyde resins such as condensates with formaldehyde of methylolurea, methylolmelamine, alkylated methylolurea, alkylated methylolmelamine, acetoguanamine and benzoguanamine; salts of divalent metals or trivalent metals such as sodium, potassium, magnesium, calcium, aluminum, iron and nickel, and oxides of the metals. Preferable among the crosslinking agents are amino-formaldehyde resins, especially a compound having a methylol group. A methylolmelamine is exemplifies as the compound having a methylol group.

A mixing content of the crosslinking agent is usually in the range of from about 0.1 to about 35 parts by weight and more preferably in the range of from 10 to 25 parts by weight relative to 100 parts by weight of a polyvinyl alcohol-based resin. A polarizing plate having uniform polarization characteristics and excellent in durability can be obtained in such ranges.

On the other hand, in order to improve durability, a crosslinking agent can be mixed in the range of more than 30 parts by weight and not more than 46 parts by weight relative to 100 parts by weight of a polyvinyl alcohol-based resin. Especially, in a case where a polyvinyl alcohol-based resin containing an acetoacetyl group is used, a mixing content of a crosslinking agent is preferably more than 30 parts by weight. A water resistance can be drastically improved by mixing a crosslinking agent in the range of more than 30 parts by weight and not more than 46 parts by weight. The more a mixing content of a crosslinking agent is in the range, the better the agent works, wherein a mixing content thereof is preferably 31 parts by weight or more, more preferably 32 parts by weight or more and especially preferably 35 parts by weight or more. On the other hand, if a mixing content of a crosslinking agent is excessively more, a reaction of a crosslinking agent progresses in a short time to thereby tend to cause an adhesive to be gelated. As a result, a pot life as an adhesive is extremely shorter, which makes industrial use thereof difficult. A mixing content of a crosslinking agent is preferably 46 parts by weight or less, more preferably 45 parts by weight or less and most preferably 40 parts by weight or less from the view point described above.

An adhesive for polarizing plates comprising a crosslinking agent and a polyvinyl alcohol-based resin having an acetoacetyl group is used as an aqueous solution. No specific limitation is imposed on a concentration thereof in the aqueous solution, and the concentration is usually from 0.1 to 15 weight % and preferably from 0.5 to 10 weight % in consideration of coatability and self stability etc.

A pH of an aqueous solution used as the adhesive for polarizing plates is adjusted to be 4.3 or less. No specific limitation is placed on an adjustment method for a pH, but, for example, an acid is contained in an aqueous solution for the adjustment.

Examples of the acid include: inorganic acids such as nitric acid, hydrochloric acid and sulfuric acid; and organic acids such as acetic acid, citric acid, oxalic acid, boric acid, phosphoric acid, formic acid and gluconic acid. Among the acids, preferable are the organic acids among which preferable is acetic acid used in producing a polyvinyl alcohol.

Note that various additives described below can be further mixed into an adhesive, if the aqueous solution has a pH of 4.3 or less, coupling agents such as a silane coupling agent and a titanium coupling agent; various kinds of tackifiers; an ultraviolet absorbent; an antioxidant; stabilizers such as a heat resistance stabilizer and a hydrolysis resistance stabilizer; and the like.

A polarizing plate of the invention is manufactured by adhere a transparent protective film to a polarizer with the adhesive. In the polarizing plate of the invention, a transparent protective film or transparent protective films are provided on one surface or both surfaces of a polarizer with an adhesive agent layer formed with the adhesive for polarizing plates interposed therebetween.

A polarizing plate of the invention is manufactured by coating the adhesive for polarizing plates on a surface of a transparent protective film on which the adhesive layer is formed and/or a surface of a polarizer on which the adhesive layer is formed and thereafter, adhering the transparent protective film and the polarizer to each other. Coating of the adhesive may be performed on one/or both of the transparent protective film and the polarizer. Coating of the adhesive is preferably conducted so as to achieve a thickness after drying of the order in the range of from 30 to 300 nm. No specific limitation is imposed on a coating operation and any of various kinds of methods such as a roll method, a spray method and an immersion method can be adopted.

Note that since a pot life of an adhesive in the invention is long, no requirement arises that a time from preparation of an adhesive to be coated in short, but an adhesive preparing step either may be incorporated into part of a series of steps or may also be performed by installing a proper preparation apparatus.

In connection with the adhesive, preferably controlled are temperatures, respectively, from preparation of the adhesive by mixing a crosslinking agent into a polyvinyl alcohol-based resin having an acetoacetyl group to coating thereof. Such a control of a temperature of an adhesive can improve a water resistance. A control temperature of the adhesive is preferably in the range of from 20 to 50° C., more preferably in the range of from 25 to 45° C. and further more preferably in the range of from 30 to 40° C. If the temperature is lower than 20° C., a water resistance is poor and peeling easily occurs between protective film and polarizer in a humidified condition. If the temperature is higher than 50° C., an adhesive is easily gelated immediately after mixing a crosslinking agent, which renders the adhesive difficult in use.

After the adhesive is coated, the transparent protective is adhered to the polarizer with a roll laminator or the like. After adhesion, a drying step is performed to thereby form an adhesive layer that is a dry coated layer. A drying temperature is from about 5 to about 150° C., preferably from 30 to 120° C. and for a time of 120 sec or longer, preferably for a time 300 sec or longer.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film comprises dichromatic materials such as iodine, dichromatic dye is suitably used. Although thickness of polarizer is not especially limited, the thickness of about 5 to about 80 μm is commonly adopted.

A polyvinyl alcohol-based film can be formed by means of one of various methods such as a flow method in which a master liquid obtained by dissolving a polyvinyl alcohol-based resin into water or an organic solvent is caused to flow to form a film, a cast method and an extrusion method, and a film formed with a method can be properly employed. A polymerization degree of a polyvinyl alcohol-based resin is preferably in the range of from about 100 to about 5000 and more preferably in the range of from about 1400 to about 4000.

A polarizer obtained by uniaxially stretching a polyvinyl alcohol-based film after being dyed with iodine or the like can be manufactured by means of the following method:

In the dyeing step, a polyvinyl alcohol-based film is immersed in a dyeing bath to which iodine is added at a temperature of in the range of from about 20 to about 70° C. for a time in the range of from about 1 to about 20 minutes to thereby cause iodine to be adsorbed. An iodine concentration in the dyeing bath is usually in the range of from about 0.1 to about 1 part by weight relative to 100 parts by weight of water. A assistant may be added in the dyeing bath in the range of from about 0.02 to about 20 parts by weight and preferably in the range of 2 to 10 parts by weight; example of the assistant include: iodides such as potassium iodine, lithium iodide, sodium iodide, zinc iodide, aluminum iodide, lead iodide, copper iodide, barium iodide, calcium iodide, tin iodide and titanium iodide. The additives are especially preferable in order to enhance a dyeing efficiency. An organic solvent compatible with water can be contained in a small content.

A polyvinyl alcohol-based film may also be subjected to a swelling treatment in a water bath or the like at a temperature in the range of from about 20 to about 60° C. for a time in the range of about 0.1 to about 10 minutes before being dyed in a water bath containing iodine or a dichroic dye. Washing a polyvinyl alcohol-based film also exerts an effect of preventing non-uniformity such as unevenness in dyeing by swelling the polyvinyl alcohol-based film in addition to effects that contaminants and a blocking preventive agent on a surface of the polyvinyl alcohol-based film can be cleaned.

A polyvinyl alcohol-based film to which a dyeing treatment is applied can be crosslinked if necessary. A composition of a crosslinking aqueous solution conducting a crosslinking treatment is such that crosslinking agents such as boric acid, borax, glyoxal and glutaric aldehyde are usually either alone or in mixture added in the range of from about 1 to about 10 parts by weight relative to 100 parts by weight of water. A concentration of a cross linking agent is determined in consideration of a balance between optical characteristics and shrinkage of a polarizing plate caused by a stretching force generated in the polyvinyl alcohol-based film.

An assistant may be added into a crosslinking bath in the range of 0.05 to 15 parts by weight and preferably in the range of from 0.5 to 8 weight %; examples of the assistant includes: iodides such as potassium iodine, lithium iodide, sodium iodide, zinc iodide, aluminum iodide, lead iodide, copper iodide, barium iodide, calcium iodide, tin iodide and titanium iodide. The additives are especially preferable since uniform in-plane characteristics of a polarizer can be obtained. A temperature of an aqueous solution is usually in the range of from about 20 to about 70° C. and preferably in the range of from 40 to 60° C. No specific limitation is imposed on an immersion time, but an immersion time is usually in the range of from about 1 second to about 15 minutes and preferably in the range of from 5 seconds to 10 minutes. An organic solvent compatible with water may be contained in a small quantity in addition to a water solvent.

A total stretch magnification of a polyvinyl alcohol-based film is about 3 to about 7 times, preferably 5 to 6 times and more preferably 5 to 6.5 times as large as the original length. If a total stretch magnification exceeds 7 times, the film is easier to be broken. Stretching may be conducted after being dyed with iodine, while being dyed or while being crosslinked, or followed by dyeing with iodine. A stretching method and the number of times of stretching are not specifically limited and stretching may be conducted only in one step. Alternatively, plural times of stretching may be conducted in the same step.

A polyvinyl alcohol-based film to which an iodine adsorption orientation treatment is applied can be further subjected to a step of immersing the film in an aqueous solution of an iodide such as potassium iodide with a concentration in the range of from 0.1 to 10 mass % at a temperature in the range of from about 10 to about 60° C. and preferably on the order in the range of from 30 to 40° C. for a time in the range of from 1 second to 1 minute. An assistant such as zinc sulfate or zinc chloride may be added into an iodide aqueous solution. A polyvinyl alcohol-based film to which an iodine adsorption orientation treatment is applied can be subjected to water washing step and a drying step at a temperature in the range of about 20 to about 80° C. for a time in the range of from about 1 minute to about 10 minutes.

Proper transparent materials may be used as a transparent polymer or a film material that forms the transparent protective file, and the material having outstanding transparency, mechanical strength, heat stability and outstanding moisture interception property, etc. may be preferably used. As materials of the above-mentioned transparent protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a transparent protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. The transparent protective film is formed as a cured layer made of heat curing type or ultraviolet ray curing type resins, such as acryl based, urethane based, acryl urethane based, epoxy based, and silicone based, etc.

Moreover, as is described in Japanese Patent Laid-Open Publication No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

Thickness values of the transparent protective film can be properly determined and generally on the order in the range of from about 1 to about 500 μm from the viewpoint of a strength, workability such as handlability, requirement for a thin film and the like. Especially, the thickness values are preferably is in the range of from 1 to 300 μm and more preferably in the range of from 5 to 200 μm.

Moreover, it is preferable that the transparent protection film may have as little coloring as possible. Accordingly, a protection film having a retardation value in a film thickness direction represented by $Rth=[(nx+ny)/2-nz]\times d$ of from −90 nm to +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protection film may mostly be cancelled using a protection film having a retardation value (Rth) of from −90 nm to +75 nm in a thickness direction. The retardation value (Rth) in a thickness direction is preferably from −80 nm to +60 nm, and especially preferably from −70 nm to +45 nm.

As transparent protective films, a cellulose-based polymer such as triacetyl cellulose is preferable from the standpoint of a polarization characteristic, a durability or the like. Especially preferable is a triacetyl cellulose film. As the same reason, polyolefin that has cyclo-type or norbornene structure is preferably used. Note that in a case where protective films are provided on both sides of a polarizer, the protective films made from the same polymer may be used on both sides thereof or alternatively, the protective films made from polymer materials different from each other may also be used on respective both sides thereof.

An easy adhesion treatment can be applied onto a surface of a transparent protective film which is adhered to a polarizer. Examples of easy adhesion treatments include: dry treatments such as a plasma treatment and a corona treatment; chemical treatment such as alkaline treatment; and a coating treatment in which an easy adhesion layer is formed. Among them, preferable are a coating treatment and an alkaline treatment each forming an easy adhesion layer. In formation of an easy adhesion layer, there can be used each of various kinds of easy adhesion materials such as a polyol resin, a polycarboxylic resin and a polyester resin. Note that a thickness of an easy adhesion layer is preferably usually from about 0.01 to about 10 µm, more preferably from about 0.05 to about 5 µm and especially preferably from about 0.1 to about 1 µm.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 µm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective film etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective film directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyarylates and polyamides; aligned films comprising liquid crystal materials, such as liquid crystal polymer; and films on which an alignment layer of a liquid crystal material is supported may be mentioned. A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal biaxial stretching and a biaxial stretched film as inclined alignment film etc. may be used. As inclined alignment film, for example, a film obtained using a method in which a heat shrinking film is adhered to a polymer film, and then the combined film is heated and stretched or shrunk under a condition of being influenced by a shrinking force, or a film that is aligned in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the optical film. As an example, about 10 to about 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which an adhesive layer is once formed on a separator, as mentioned above, and is then transferred on a polarizing plate or an optical film may be mentioned.

An adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessary, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflector is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent substrate in an order configuring an illuminant (organic electro luminescence illuminant). Here, an organic emitting layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic emitting layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic emitting layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic emitting layer is formed by a very thin film about 10 nm in thickness. For this reason, light is transmitted nearly completely through organic emitting layer as through transparent electrode. Consequently, since the light that enters, when light is not emitted, as incident light from a surface of a transparent substrate and is transmitted through a transparent electrode and an organic emitting layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Description will be given of a construction and effect of the invention with examples and the like showing them below. Note that in the examples, part or parts and % are based on weight unless otherwise specified. Measurement of a pH was conducted with a Portable pH Meter D-23 (9620) manufactured by HORIBA, Ltd.

Example 1

Polarizer

A polyvinyl alcohol film with a thickness of 80 μm was swollen in pure water. Then, the film was dyed in a 5% iodine aqueous solution (with a ratio of iodine to potassium iodide is 1 to 10) and thereafter, was immersed into an aqueous solution containing boric acid at a concentration of 3% and potassium iodide at a concentration of 2%. Then, the film was stretched 5.5-times in the aqueous solution containing boric acid at a concentration of 4% and potassium iodide at a concentration of 3%, followed by immersion in a bath containing potassium iodide at a concentration of 5%. After stretching, the film was dried in an oven at 30° C. for 3 min to thereby obtain a polarizer.

(Transparent Protective Film)

A triacetyl cellulose film with a thickness of 80 μm was used.

(Preparation of Adhesive)

100 parts by weight of a polyvinyl alcohol-based resin (with an average polymerization degree of 1200, a saponification degree of 98.5 mol % and an acetoacetylation degree of 5 mol %) containing an acetoacetyl group and 35 parts of methylol melamine as a crosslinking agent were dissolved into pure water at a temperature of 30° C. to prepare an aqueous solution A with an adjusted solid matter concentration of 3%. Then, acetic acid at a concentration of 0.4% was added into the aqueous solution A to adjust a pH to 2.5. The pH adjusted aqueous solution was used as an adhesive.

(Manufacture of Polarizing Plate)

The above adhesive was coated on one surface of the transparent protective film to a thickness after drying of 150 nm. The adhesive was coated when 30 minutes elapsed from preparation. Then, triacetyl cellulose films with an adhesive coated were adhered to on both surfaces of a polarizer with a roll machine and the composite film was dried at 55° C. for 5 min to thereby manufacture a polarizing plate.

Example 2

An adhesive was prepared in a similar way to that in Example 1 with the exception that in Example 1 (Preparation of Adhesive), 0.3% of acetic acid was added to the aqueous solution A and pH adjusted to 3.0. A polarizing plate was manufactured in a similar way to that in Example 1 with the exception that in the example 1, the adhesive was used.

Example 3

An adhesive was prepared in a similar way to that in Example 1 with the exception that in Example 1 (Preparation of Adhesive), 0.1% of acetic acid was added to the aqueous solution A and pH adjusted to 3.5. A polarizing plate was manufactured in a similar way to that in Example 1 with the exception that in the example 1, the adhesive was used.

Example 4

An adhesive was prepared in a similar way to that in Example 1 with the exception that in Example 1 (Preparation of Adhesive), 0.03% of acetic acid was added to the aqueous solution A and pH adjusted to 4.0. A polarizing plate was manufactured in a similar way to that in Example 1 with the exception that in the example 1, the adhesive was used.

Example 5

An adhesive was prepared in a similar way to that in Example 1 with the exception that in Example 1 (Preparation of Adhesive), 0.5% of acetic acid was added to the aqueous solution A and pH adjusted to 2.0. A polarizing plate was manufactured in a similar way to that in Example 1 with the exception that in the example 1, the adhesive was used.

Comparative Example 1

An adhesive was prepared in a similar way to that in Example 1 with the exception that in Example 1 (Preparation of Adhesive), acetic acid was not added to the aqueous solution A. A pH of the aqueous solution was 4.5. A polarizing plate was manufactured in a similar way to that in Example 1 with the exception that in Example 1, the adhesive was used.

Comparative Example 2

An adhesive was prepared in a similar way to that in Example 1 with the exception that in Example 1 (Preparation of Adhesive), a 4% sodium hydroxide aqueous solution was added into the aqueous solution A so that an obtained sodium hydroxide concentration in the aqueous solution was 0.06% to thereby adjust a pH to 5.0. A polarizing plate was manufactured in a similar way to that in Example 1 with the exception that in Example 1, the adhesive was used.

Comparative Example 3

An adhesive was prepared in a similar way to that in Example 1 with the exception that in Example 1 (Preparation of Adhesive), a content of use of a crosslinking agent is changed to 15 parts and acetic acid was not added into an obtained aqueous solution. A pH of the adhesive was 4.5. A polarizing plate was manufactured in a similar way to that in Example 1 with the exception that in Example 1, the adhesive was used.

(Evaluation)

The following evaluation was conducted on the polarizing plates obtained in the examples and the comparative examples. Results are shown in Table 1.

(Pot Life)

A pot life of an adhesive agent was measured. A pot life was measured in the following way: An adhesive was agitated for 10 minutes after preparation and then, the adhesive 50 ml was put into a disposable cup (100 ml) and a time required till gelation was measured. Recognition of gelation was visually conducted by actually observing that when part of the adhesive was raised above the surface of the rest of the adhesive, the part thereof becomes stringy, when the phenomenon is recognized, the adhesive is solidified in a very short time. The longer a pot life is, the better it is and degrees of freedom for a process and environmental (usage) conditions increase. A pot life is preferably 12 hours or longer as a criterion of a pot life.

(Water Resistance)

Samples were prepared by cutting a polarizing plate into pieces each with size of a length in the absorption axis direction of a polarizer of 50 mm and a length in a direction perpendicular to the absorption axis of 25 mm. A peel ratio was measured when the sample was immersed in warm water at 60° C. for 4 hours. A peel ratio was defined by a ratio of a peel quantity starting from an edge of a polarizing plate to a size of the sample. With a larger peel ratio, a sufficient adhesive strength is not obtained according to an environmental (use) conditions. A smaller peel ratio is better and it is preferably 18% or less.

TABLE 1

| | Adhesive | | | |
|---|---|---|---|---|
| | Crosslinking agent mixing content | pH | Pot life (hr) | Water resistance <peel ratio (%)> |
| Example 1 | 35 | 2.5 | 80 hr or longer | 13 |
| Example 2 | 35 | 3 | 28 hr | 5 |
| Example 3 | 35 | 3.5 | 20 hr | 2 |
| Example 4 | 35 | 4 | 18 hr | 0 |
| Example 5 | 35 | 2 | 80 hr or longer | 20 |
| Comparative Example 1 | 35 | 4.5 | 4 hr | 0 |
| Comparative Example 2 | 35 | 5 | 2.5 hr | 0 |
| Comparative Example 3 | 15 | 4.5 | 8 hr | 20 |

It is understood from Table 1 that as a pH is smaller into the acidic side, a pot life can be longer. That is, an adhesive containing a polyvinyl alcohol-based resin having an acetoacetyl group with a pH adjusted to 4.3 or less, which is in the range of the invention, is good in pot life. On the other hand, with a higher pH, a water resistance is deteriorated. A pot life and a wafer resistance are in a relationship of a trade-off therebetween, but an adhesive with a pH adjusted in the range of from 2.2 to 4.3 is long in pot life and good in water resistance. If the number of parts of a crosslinking agent added into an adhesive agent is, as shown in comparative example 3, reduced in order to acquire a longer pot life, it results in degraded water resistance.

INDUSTRIAL APPLICABILITY

An adhesive for polarizing plates of the invention is good in durability and long in pot life. A polarizing plate obtained by adhering a polarizer and a transparent protective film to each other with the adhesive for polarizing plates is preferably used, alone or as an optical film obtained by laminating the polarizing plates, in an image display such as a liquid crystal display, an organic EL display, PDP or the like.

The invention claimed is:

1. An adhesive for polarizing plates used for forming an adhesive layer in a polarizing plate in which a polarizer and a transparent protective film are adhering with each other via the adhesive layer, wherein the adhesive for polarizing plates is an aqueous solution containing a polyvinyl alcohol-based resin having an acetoacetyl group and a crosslinking agent, wherein a degree of modification of the polyvinyl alcohol-based resin by the acetoacetyl group is from 2 to 7 mol. %, and the crosslinking agent is mixed in the range of more than 30 parts by weight and not more than 46 parts by weight relative to 100 parts by weight of the polyvinyl alcohol-based resin, and wherein a pH of the aqueous solution is in the range of from 2.2 to 4.3.

2. The adhesive for polarizing plates according to claim 1, wherein the aqueous solution contains an acid.

3. The adhesive for polarizing plates according to claim 2, wherein the acid is an organic acid.

4. The adhesive for polarizing plates according to claim 3, wherein the organic acid is an acetic acid.

5. The adhesive for polarizing plates according to claim 1, wherein a polarizer is a polyvinyl alcohol-based polarizer.

6. A manufacturing method for a polarizing plate, wherein a transparent protective film is adhered to at least one surface of a polarizer using an adhesive for polarizing plates according to claim 1.

7. A polarizing plate comprising: a polarizer and a transparent protective film which is provided on at least one surface of the polarizer via an adhesive layer, wherein the adhesive layer is formed with the adhesive for polarizing plates according to claim 1.

8. The polarizing plate according to claim 7, wherein a thickness of an adhesive layer is in the range of from 30 to 300 nm.

9. An optical film comprising at least one polarizing plate according to claim 7.

10. An image display comprising a polarizing plate according to claim 7.

* * * * *

UNITED STATES PATENT AND TRADEMARK OFFICE
CERTIFICATE OF CORRECTION

PATENT NO. : 7,662,447 B2 Page 1 of 1
APPLICATION NO. : 10/583990
DATED : February 16, 2010
INVENTOR(S) : Tomoguchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 466 days.

Signed and Sealed this

Thirtieth Day of November, 2010

David J. Kappos
*Director of the United States Patent and Trademark Office*